US012647312B2

(12) United States Patent
Rodrigo et al.

(10) Patent No.: US 12,647,312 B2
(45) Date of Patent: Jun. 2, 2026

(54) METHODS AND DEVICES FOR BINDING INDICATION

(71) Applicant: Telefonaktiebolaget LM Ericsson (publ), Stockholm (SE)

(72) Inventors: Maria Cruz Bartolome Rodrigo, Madrid (ES); Qiang Liu, Shanghai (CN); Jesus Angel De Gregorio Rodriguez, Madrid (ES); Fuencisla Garcia Azorero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 18/249,835

(22) PCT Filed: Sep. 23, 2021

(86) PCT No.: PCT/CN2021/119823
§ 371 (c)(1),
(2) Date: Apr. 20, 2023

(87) PCT Pub. No.: WO2022/083394
PCT Pub. Date: Apr. 28, 2022

(65) Prior Publication Data
US 2025/0274335 A1        Aug. 28, 2025

(30) Foreign Application Priority Data
Oct. 23, 2020        (WO) ................ PCT/CN2020/123137

(51) Int. Cl.
H04L 41/0631        (2022.01)
H04L 67/55        (2022.01)
H04L 67/02        (2022.01)

(52) U.S. Cl.
CPC ................................ H04L 41/0631 (2013.01)

(58) Field of Classification Search
CPC ...... H04L 41/0631; H04L 67/02; H04L 67/55
See application file for complete search history.

(56) References Cited

U.S. PATENT DOCUMENTS 11,650,866 B2 * 5/2023 Landais ................ H04M 15/66
719/318
2020/0314615 A1 10/2020 Patil et al.
(Continued)

FOREIGN PATENT DOCUMENTS

CN        106130894 A        11/2016
WO        2019210675 A1        11/2019
WO        2020202043 A1        10/2020

OTHER PUBLICATIONS

"Corrections to Principles for Binding, Selection and Reselection", 3GPP TSG-SA2 Meeting #138-E, S2-2003351, Nokia, Nokia Shanghai-Bell, Online, Apr. 20-23, 2020, 7 pages.
(Continued)

*Primary Examiner* — Kamal M Hossain
(74) *Attorney, Agent, or Firm* — Murphy, Bilak & Homiller, PLLC

(57)        ABSTRACT

A method for binding indication is provided. The method is implemented by a first network function in a communication network. The method may comprise generating a first binding information for a first notification endpoint in a network function, the first binding information indicating a first intended user of the first binding information and a first resource owner of the first notification endpoint. The method may further comprise sending the first binding information to a second network function.

10 Claims, 7 Drawing Sheets

(56) References Cited

U.S. PATENT DOCUMENTS

| | | | | | |
|---|---|---|---|---|---|
| 2022/0046410 | A1* | 2/2022 | Bega | ..................... | H04L 41/142 |
| 2022/0053372 | A1* | 2/2022 | Shekhar | ................. | H04L 67/56 |
| 2023/0035572 | A1* | 2/2023 | Belling | .............. | H04L 41/5058 |

OTHER PUBLICATIONS

"Notification Binding for Default Subscription", 3GPP TSG-CT WG4 Meeting #99e, C4-204507 was C4-204440 was C4-204254, Ericsson, E-meeting, Aug. 18-28, 2020, 5 pages.
"Routing Binding indication without delegated discovery", SA WG2 Meeting #S2-140e, S2-2006482, Ericsson, Electronic Meeting, Aug. 19-Sep. 1, 2020, 5 pages.
"Reselection with indirect communication", 3GPP TSG-CT WG4 Meeting #99e, C4-204247, E-Meeting, Aug. 18-28, 2020, 7 pages.
"3rd Generation Partnership Project; Technical Specification Group Core Network and Terminals; 5G System; Technical Realization of Service Based Architecture; Stage 3 (Release 17)", 3GPP TS 29.500 V17.0.0, Sep. 2020, 82 pages.
"3rd Generation Partnership Project; Technical Specification Group Core Network and Terminals; 5G System; Usage of the Unified Data Repository service for Policy Data, Application Data and Structured Data for Exposure; Stage 3 (Release 16)", 3GPP TS 29.519 V16.4.0, Jun. 2020, 163 pages.
3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 1-440.
3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, 1-447.
"Binding Indication sent from a Service Consumer", 3GPP TSG-CT WG4 Meeting #97e; C4-202078; E-Meeting, Apr. 15-24, 2020, 3 pages.
"Notification URI", 3GPP TSG-SA WG2 Meeting #136; S2-1912308; Reno, NV, USA, Nov. 18-22, 2019, 5 pages.

* cited by examiner generating a first binding information for a first binding resource in a network function — 501 sending the first binding information to a second network device — 502

500

Figure 6:
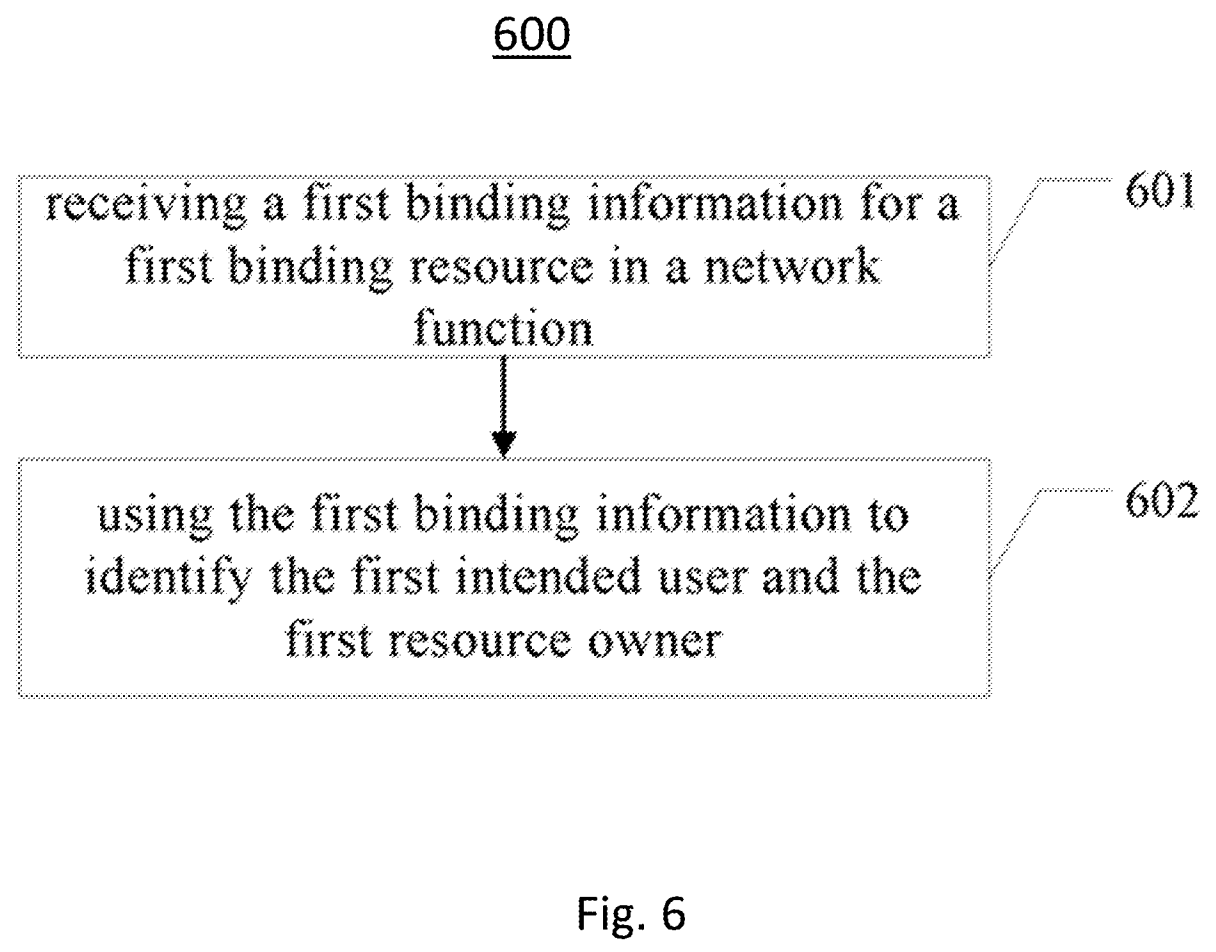

600

601 receiving a first binding information for a first binding resource in a network function

602 using the first binding information to identify the first intended user and the first resource owner

Memory

Code

Network Device

701

Processor

METHODS AND DEVICES FOR BINDING INDICATION

TECHNICAL FIELD

The present disclosure generally relates to communication networks, and more specifically to methods and devices for binding indication.

BACKGROUND

Binding can be used to indicate suitable target Network Function (NF) producer instance(s) for NF service instance selection, reselection and routing of subsequent requests associated with a specific NF producer resource (context) and NF service. This allows the NF producer to indicate that the NF consumer, for a particular context, should be bound to an NF service instance, NF instance, NF service set or NF set depending on local policies and other criteria (e.g. at what point it is in the middle of a certain procedure, considering performance aspects etc).

Binding can also be used by the NF consumer to indicate suitable NF consumer instance(s) for notification target instance reselection and routing of subsequent notification requests associated with a specific notification subscription and for providing Binding Indication for service(s) that the NF consumer produces for the same data context and the NF service producer is subsequently likely to invoke.

For 5GC from Rel-16, a new Binding indication is defined. This indication allows an Network Function Producer (NFp) to indicate a preferred binding level and a binding for reselection (in case of failure or e.g. load-balancing). The binding level indicates the resilience model that may be used for subsequent requests, e.g. NF (service) Set, NF instance.

The Binding indication is defined to be included in requests and responses, with different intentions.

A Binding indication provided as part of an explicit or implicit subscription would apply to the corresponding notification.

In 3GPP TS 29.500, clause 5.2.3.2.6 an example is indicated:

EXAMPLE 6: Subscription Request from One NF on Behalf of Another NF, with 2 Binding Indications
3gpp-Sbi-Binding: bl=nf-set;
    nfset=set1.udmset.5gc.mnc012.mcc345;
    servname=nudm-ee; scope=subscription-events
3gpp-Sbi-Binding: bl=nf-set;
    nfset=set1.nefset.5gc.mnc012.mcc345;
    servname=nnef-event-exposure.

SUMMARY

The solution disclosed herein aims to enable direct notifications between network functions.

The solution proposes to complement a Binding indication with the identification of the intended user (notification sender) and the resource owner to the one the Binding applies. As an alternative, this information may be included in application payload, when it needs to be stored in Unified Data Repository (UDR).

In addition, the disclosure provides a mechanism to associate a Binding resource to a subscription information (that includes a notification Uniform Resource Identifier (URI), or as well named callback URI) when more than one Binding is included in a request.

According to a first aspect of the present disclosure, there is provided a method implemented by a first network function in a communication network, the method comprises:

transmitting to a second network function a first binding information for a first notification endpoint in a network function consumer, the first binding information indicating a first intended user of the first binding information, and a first resource owner of the first notification endpoint;

wherein the first intended user is a network function producer;

wherein the first resource owner is the network function consumer;

wherein the first binding information indicates to send a notification directly from the first intended user to the first resource owner; and wherein the first binding information is included in a 3gpp-sbi-binding header.

The first binding information may be included in a binding indication sent to the second network function.

The first binding information may be sent to the second network function in addition to a binding indication.

The first binding information may be transmitted in a subscription request for a subscription event.

The first binding information may be transmitted in a subscription request for a subscription event on behalf of a third network function.

The first binding information may include a first intended user identifier for the first intended user and a first owner identifier for the first resource owner.

The first binding information may include correlation information which is used to correlate the first binding information with subscription information.

The correlation information may include an event identifier of the subscription event in the subscription information.

The correlation information may include information to allow identification of a notification receiver.

The correlation information may be the authority part of the notification Uniform Resource Identifier URI for the subscription event in the subscription information.

The method may further comprise:

transmitting to the second network function a second binding information for a second notification endpoint, the second binding information indicating a second intended user of the second binding information and a second resource owner of the second notification endpoint;

wherein the second intended user is a second network function producer;

wherein the second resource owner is a second network function consumer;

wherein the second binding information indicates to send a notification directly from the second intended user to the second resource owner; and wherein the second binding information is included in a 3gpp-sbi-binding header.

The first network function may be the network function consumer, the third network function and/or the second network function consumer.

The second network function may be the network function producer and/or the second network function producer.

According to a second aspect of the present disclosure, there is provided a method implemented by a second network function in a communication network. The method comprises:

receiving from a first network function a first binding information for a first notification endpoint in a network function consumer, the first binding information indicating a first intended user of the first binding information and a first resource owner of the first notification endpoint;

wherein the first intended user is a network function producer;

wherein the first resource owner is the network function consumer;

wherein the first binding information indicates to send a notification directly from the first intended user to the first resource owner; and wherein the first binding information is included in a 3gpp-sbi-binding header.

The first binding information may be included in a binding indication received by the second network function.

The first binding information may be received by the second network function in addition to a binding indication.

The first binding information may be received in a subscription request for a subscription event.

The first binding information may be received in a subscription request for a subscription event on behalf of a third network function.

The first binding information may include a first intended user identifier for the first intended user and a first owner identifier for the first owner.

The first binding information may include correlation information which is used to correlate the first binding information with subscription information.

The correlation information may include an event identifier of the subscription event in the subscription information.

The correlation information may include information to allow identification of a notification receiver.

The notification receiver information may be the authority part of the notification Uniform Resource Identifier URI for the subscription event in the subscription information.

The method may further comprise:

using the first binding information to identify the first intended user and the first resource owner;

wherein the first intended user is the second network function; and transmitting, based on the first binding information, a notification directly from the first intended user to the first resource owner.

The method may further comprise:

receiving at the second network function a second binding information for a second notification endpoint, the second binding information indicating a second intended user of the second binding information and a second resource owner for the second notification endpoint;

wherein the second intended user is a second network function producer;

wherein the second resource owner is a second network function consumer;

wherein the second binding information indicates to send a notification directly from the second intended user to the second resource owner; and wherein the second binding information is included in a 3gpp-sbi-binding header;

using the second binding information to identify the second intended user and the second resource owner;

wherein the second intended user is the second network function; and transmitting, based on the second binding information, a notification directly from the second intended user to the second resource owner.

The first network function may be the network function consumer, the third network function and/or the second network function consumer.

The second network function may be the network function producer and/or the second network function producer.

According to a third aspect of the disclosure there is provided a network device in a communication network. The network device may comprise a processor and a memory communicatively coupled to the processor. The memory may be adapted to store instructions which, when executed by the processor, cause the network device to perform steps of the method according to the above first aspect.

According to a fourth aspect of the present disclosure, there is provided a non-transitory machine-readable medium having a computer program stored thereon. The computer program, when executed by a set of one or more processors of a network device, causes the network device to perform steps of the method according to the above first aspect.

According to a fifth aspect of the disclosure there is provided a network device in a communication network. The network device may comprise a processor and a memory communicatively coupled to the processor. The memory may be adapted to store instructions which, when executed by the processor, cause the network device to perform steps of the method according to the above second aspect.

According to a sixth aspect of the present disclosure, there is provided a non-transitory machine-readable medium having a computer program stored thereon. The computer program, when executed by a set of one or more processors of a network device, causes the network device to perform steps of the method according to the above second aspect.

Advantageously, the solution disclosed herein enables the transmission of direct notifications from a network function producer to a network function consumer, therefore reducing the signaling load in the communications network.

Further advantageously, the solution disclosed herein enables the propagation of the configuration of the above direct notifications through a chain of network functions that are not the network function producer or the network function consumer, therefore allowing the configuration of the direct notifications in any message of any procedure carried out by any NF.

Further advantageously, the solution disclosed herein enables the usage of an integral part of the 5G architecture, which are the SBI headers, to carry the configuration information.

Other objectives, features and advantages will be apparent from the following detailed disclosure, from the attached dependent claims as well as from the drawings.

BRIEF DESCRIPTION OF THE DRAWINGS

The present disclosure may be best understood by way of example with reference to the following description and accompanying drawings that are used to illustrate embodiments of the present disclosure. In the drawings:

FIG. 6 illustrates an exemplary flow diagram for a method of binding indication according to one or more embodiments of the present disclosure.

DETAILED DESCRIPTION

Figure 1:
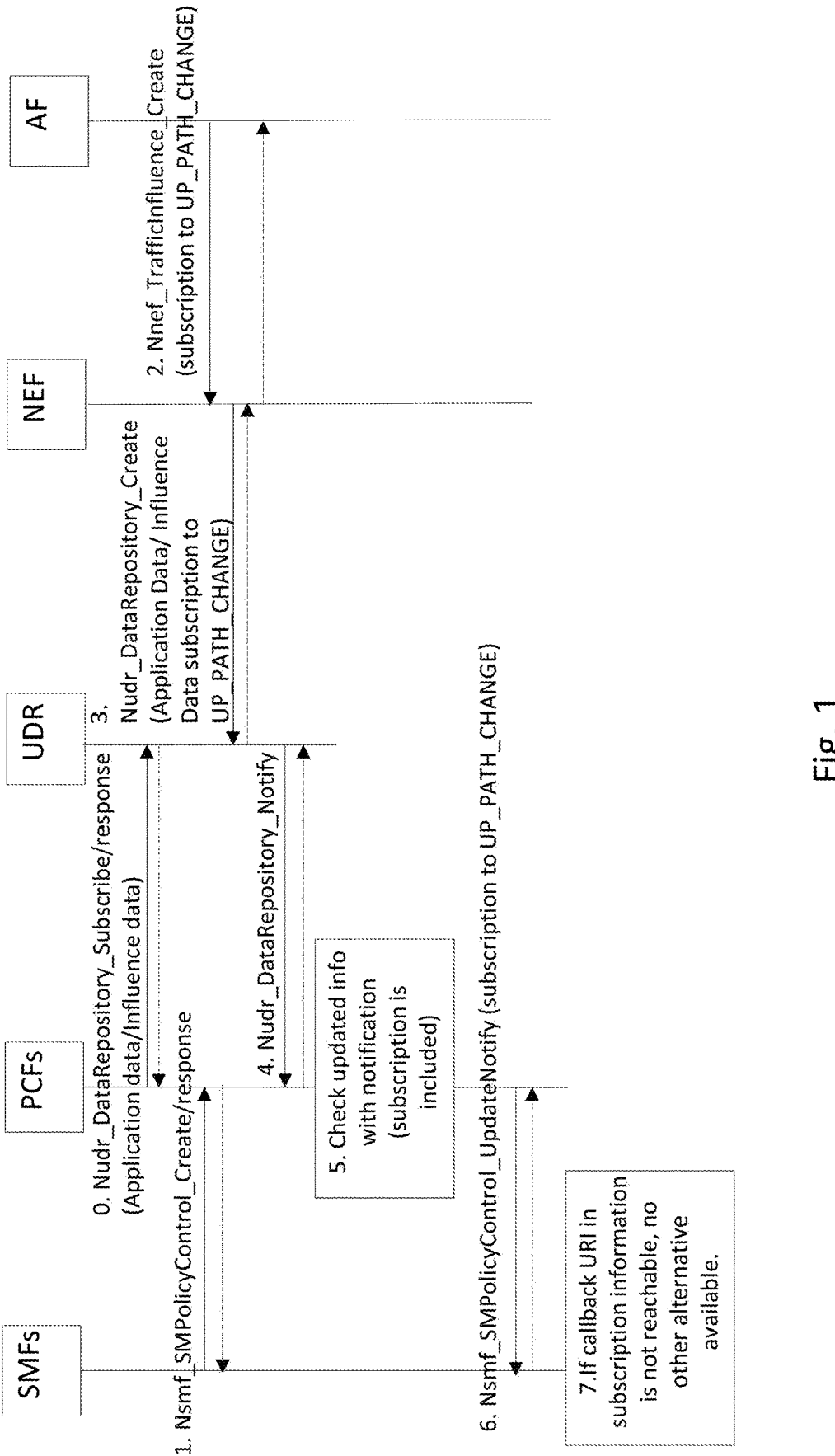
FIG. 1 is a diagram illustrating first example in which the Network Exposure Function (NEF) is unable to provide binding information for notification to be sent from Session Management Function (SMF)

The following detailed description describes methods and apparatuses for binding indication. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

As used herein, the terms "first", "second" and so forth refer to different elements. The singular forms "a", "an", and "the" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "according to" is to be read as "at least in part according to". The term "one embodiment" and "an embodiment" are to be read as "at least one embodiment". The term "another embodiment" is to be read as "at least one other embodiment".

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

Binding can be used to indicate suitable target NF producer instance(s) for NF service instance selection, reselection and routing of subsequent requests associated with a specific NF producer resource (context) and NF service. This allows the NF producer to indicate that the NF consumer, for a particular context, should be bound to an NF service instance, NF instance, NF service set or NF set depending on local policies and other criteria (e.g. at what point it is in the middle of a certain procedure, considering performance aspects etc).

Binding can also be used by the NF consumer to indicate suitable NF consumer instance(s) for notification target instance reselection and routing of subsequent notification requests associated with a specific notification subscription and for providing Binding Indication for service(s) that the NF consumer produces for the same data context and the NF service producer is subsequently likely to invoke.

The NF service producer may provide a Binding Indication to the NF service consumer as part of the Direct or Indirect Communication procedures, to be used in subsequent related service requests. The level of Binding Indication provided by the NF service producer to the NF consumer indicates if the resource in the NF service producer is either bound to NF service instance, NF instance, NF Service Set or NF set. The Binding Indication may include NF Service Set ID, NF Set ID, NF instance ID, or NF service instance ID, for use by the NF consumer or SCP for NF Service Producer (re-)selection. If the resource is created in the NF Service Producer, the NF Service Producer provides resource information which includes the endpoint address of the NF service producer. For indirect communication, the NF service consumer copies the Binding Indication into the Routing Binding Indication in Request or Subscribe message.

During explicit or implicit notification subscription, a Binding Indication may be provided by the NF service consumer to NF service producer; the NF service consumer will also provide a Notification Endpoint. The NF service consumer may also provide a Binding Indication in response to notification requests. The level of Binding Indication provided by the NF service consumer to the NF service provider indicates if the Notification Endpoint is either bound to NF service instance, NF instance, NF Service Set or NF set as specified in Table 6.3.1.0-1. The Binding Indication shall include at least one of NF Set ID, NF instance ID, NF Service Set ID and/or NF service instance ID, and may also include the service name. The NF Service Set ID, NF service instance ID, and service name relate to the service of the NF service consumer that will handle the notification.

As used herein, "binding resource" refers to the resource in the NF service producer when the binding indication is provided from NF producer to NF consumer and refers to Notification Endpoint when the binding indication is provided from NF consumer to NF producer.

The solution disclosed herein aims to enable direct notifications between network functions.

The solution proposes to complement a Binding indication with the identification of the intended user (notification sender) and the resource owner to the one the Binding applies. As an alternative, this information may be included in application payload, when it needs to be stored in Unified Data Repository (UDR).

In addition, the disclosure provides a mechanism to associate a Binding resource to a subscription information (that includes a notification Uniform Resource Identifier (URI), or as well named callback URI) when more than one Binding is included in a request.

According to a first aspect of the present disclosure, there is provided a method implemented by a first network function in a communication network, the method comprises:

transmitting to a second network function a first binding information for a first notification endpoint in a network function consumer, the first binding information indicating a first intended user of the first binding information, and a first resource owner of the first notification endpoint;

wherein the first intended user is a network function producer;

wherein the first resource owner is the network function consumer;

wherein the first binding information indicates to send a notification directly from the first intended user to the first resource owner; and wherein the first binding information is included in a 3gpp-sbi-binding header.

The first binding information may be included in a binding indication sent to the second network function.

The first binding information may be sent to the second network function in addition to a binding indication.

The first binding information may be transmitted in a subscription request for a subscription event.

The first binding information may be transmitted in a subscription request for a subscription event on behalf of a third network function.

The first binding information may include a first intended user identifier for the first intended user and a first owner identifier for the first resource owner.

The first binding information may include correlation information which is used to correlate the first binding information with subscription information.

The correlation information may include an event identifier of the subscription event in the subscription information.

The correlation information may include information to allow identification of a notification receiver.

The correlation information may be the authority part of the notification Uniform Resource Identifier URI for the subscription event in the subscription information.

The method may further comprise:

transmitting to the second network function a second binding information for a second notification endpoint, the second binding information indicating a second intended user of the second binding information and a second resource owner of the second notification endpoint;

wherein the second intended user is a second network function producer;

wherein the second resource owner is a second network function consumer;

wherein the second binding information indicates to send a notification directly from the second intended user to the second resource owner; and wherein the second binding information is included in a 3gpp-sbi-binding header.

The first network function may be the network function consumer, the third network function and/or the second network function consumer.

The second network function may be the network function producer and/or the second network function producer.

According to a second aspect of the present disclosure, there is provided a method implemented by a second network function in a communication network. The method comprises:

receiving from a first network function a first binding information for a first notification endpoint in a network function consumer, the first binding information indicating a first intended user of the first binding information and a first resource owner of the first notification endpoint;

wherein the first intended user is a network function producer;

wherein the first resource owner is the network function consumer;

wherein the first binding information indicates to send a notification directly from the first intended user to the first resource owner; and wherein the first binding information is included in a 3gpp-sbi-binding header.

The first binding information may be included in a binding indication received by the second network function.

The first binding information may be received by the second network function in addition to a binding indication.

The first binding information may be received in a subscription request for a subscription event.

The first binding information may be received in a subscription request for a subscription event on behalf of a third network function.

The first binding information may include a first intended user identifier for the first intended user and a first owner identifier for the first owner.

The first binding information may include correlation information which is used to correlate the first binding information with subscription information.

The correlation information may include an event identifier of the subscription event in the subscription information.

The correlation information may include information to allow identification of a notification receiver.

The notification receiver information may be the authority part of the notification Uniform Resource Identifier URI for the subscription event in the subscription information.

The method may further comprise:

using the first binding information to identify the first intended user and the first resource owner;

wherein the first intended user is the second network function; and transmitting, based on the first binding information, a notification directly from the first intended user to the first resource owner.

The method may further comprise:

receiving at the second network function a second binding information for a second notification endpoint, the second binding information indicating a second intended user of the second binding information and a second resource owner for the second notification endpoint;

wherein the second intended user is a second network function producer;

wherein the second resource owner is a second network function consumer;

wherein the second binding information indicates to send a notification directly from the second intended user to the second resource owner; and wherein the second binding information is included in a 3gpp-sbi-binding header;

using the second binding information to identify the second intended user and the second resource owner;

wherein the second intended user is the second network function; and transmitting, based on the second binding information, a notification directly from the second intended user to the second resource owner.

The first network function may be the network function consumer, the third network function and/or the second network function consumer.

The second network function may be the network function producer and/or the second network function producer.

According to a third aspect of the disclosure there is provided a network device in a communication network. The network device may comprise a processor and a memory communicatively coupled to the processor. The memory may be adapted to store instructions which, when executed by the processor, cause the network device to perform steps of the method according to the above first aspect.

According to a fourth aspect of the present disclosure, there is provided a non-transitory machine-readable medium having a computer program stored thereon. The computer program, when executed by a set of one or more processors of a network device, causes the network device to perform steps of the method according to the above first aspect.

According to a fifth aspect of the disclosure there is provided a network device in a communication network. The network device may comprise a processor and a memory communicatively coupled to the processor. The memory may be adapted to store instructions which, when executed by the processor, cause the network device to perform steps of the method according to the above second aspect.

According to a sixth aspect of the present disclosure, there is provided a non-transitory machine-readable medium having a computer program stored thereon. The computer program, when executed by a set of one or more processors of a network device, causes the network device to perform steps of the method according to the above second aspect.

Advantageously, the solution disclosed herein enables the transmission of direct notifications from a network function producer to a network function consumer, therefore reducing the signaling load in the communications network.

Further advantageously, the solution disclosed herein enables the propagation of the configuration of the above direct notifications through a chain of network functions that are not the network function producer or the network function consumer, therefore allowing the configuration of the direct notifications in any message of any procedure carried out by any NF.

Further advantageously, the solution disclosed herein enables the usage of an integral part of the 5G architecture, which are the SBI headers, to carry the configuration information.

Other objectives, features and advantages will be apparent from the following detailed disclosure, from the attached dependent claims as well as from the drawings.

FIG. 1 is a diagram illustrating first example in which the Network Exposure Function (NEF) is unable to provide binding information for notification to be sent from Session Management Function (SMF).

Step 0. PCFs subscribe to receive updates on Application data and/or Influence data.

Step 1. SMF sends a Nsmf_SMPolicyControl_Create to PCF for a new PDU session. PCF may in the response include a binding indication for the resource created by the request.

Step 2. AF sends a Nnef_TrafficInfluence_Create to NEF. This operation includes an implicit subscription to UP_PATH_CHANGE event, that is identified by SMF.

Step 3. NEF stores the data for the Application Data/ Influence Data in the UDR, including the information by the subscription from NEF to the SMF notification.

Step 4. The UDR notifies to the subscribed consumers, in this case it applies to PCF, that receives the updated Application Data/Influence Data.

Step 5. PCF checks the information received in the notification, that includes the subscription to UP_PATH_CHANGE.

Step 6. The PCF, when the updated data is received, notifies the SMF for the impacted ongoing PDU session(s), by means of Nsmf_SMPolicyControl_UpdateNotify. This notification includes the previously received subscription to UP_PATH_CHANGE.

Step 7. The subscription information received today includes a notification call-back URI, but there are not defined means to convey any other information that could allow the SMF to find an alternative endpoint in case the notification call-back URI fails.

In this first example, the subscription information is stored in UDR because it will be used for subsequent notifications.

As proposed in this disclosure, the Binding indication is complemented with information that identifies who is the intended user of the binding information (notification sender), and the resource owner of the binding resource (notification receiver) to which the Binding applies. This allows the Binding indication may traverse different NFs, but be finally used by its intended user and received by the corresponding owner.

Figure 2:
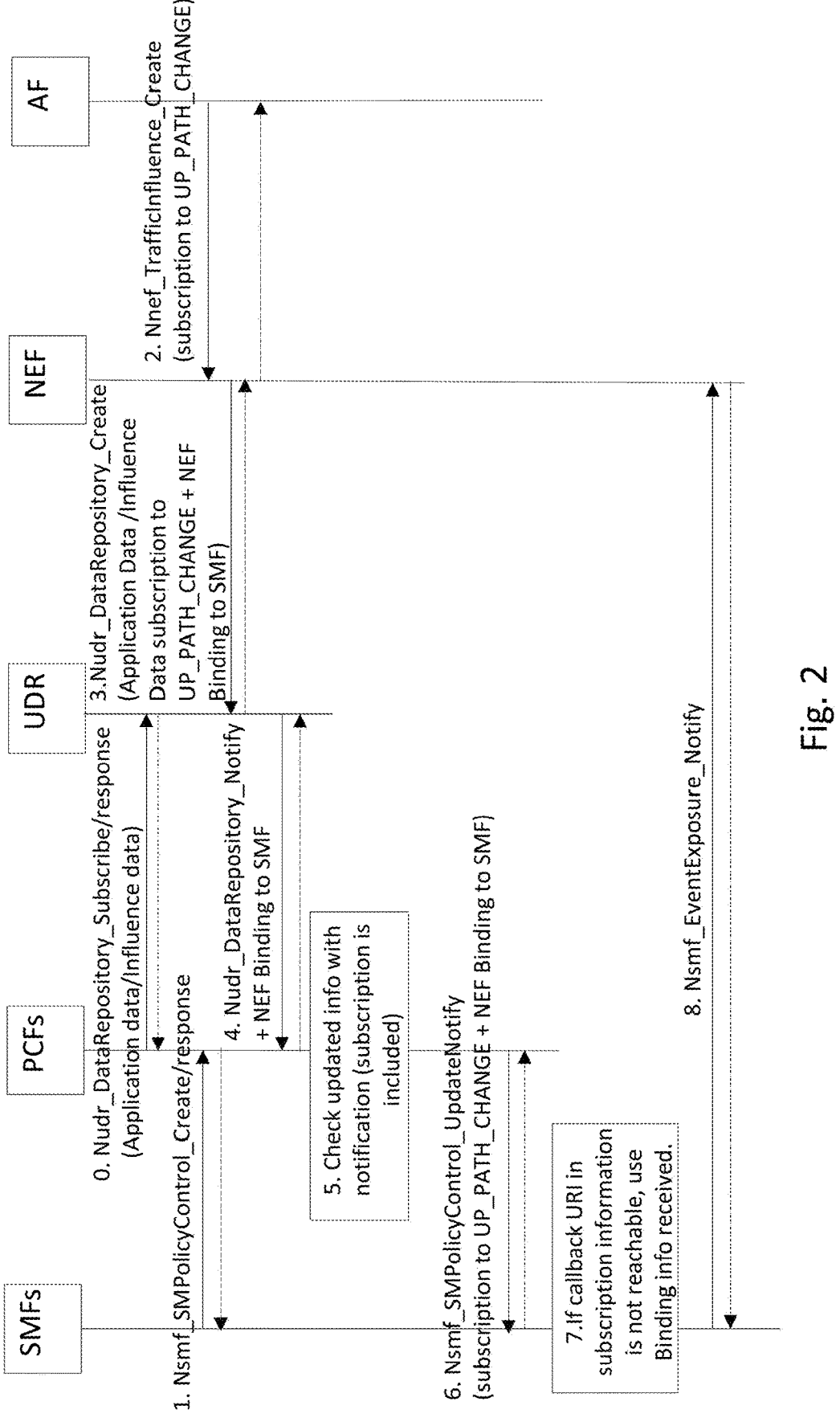
FIG. 2 illustrates a method for binding indication according to a first embodiment, which solves the problem in the first example illustrated in FIG. 1.

FIG. 2 illustrates a method for binding indication according to a first embodiment, which solves the problem in the first example illustrated in FIG. 1.

Steps are similar as the ones described for FIG. 1, with the following changes:

Step 3: Binding indication is included with additional information that identifies the intended user (notification sender), and the owner of the resource (notification receiver) for the one the Binding applies. In this example, the intended user is the SMF, while the owner of the resource is the NEF.

The "resource owner" (notification receiver) is identified by the Binding information itself, except for the "notification URI", this is missed. This is covered in detail by the third example below. In this first example, the intended user is known by the involved NFs because these specific inter-actions are only defined for NEF (as notification receiver) and SMF (as notification sender). The "intended user" will be required in case there may be multiple notification receivers for the same type of subscription.

In one embodiment, the binding indication is comple-mented with the intended user and/or the owner of the resource information and is conveyed in a header, e.g. 3gpp-Sbi-Binding header.

$3gpp-Sbi-$Binding =

"$3gpp-Sbi-$Binding":"#($OWS$"$bl$ ="$blvalue$ 1 * ($OWS$"; " parameter)

OWS ";" recoverytime; OWS ";" user; OWS ";" owner)

$blvalue$ = "$nf$ -instance"/"$nf$ -$set$"/"$nfservice$-instance"/"$nfservice$-set"

parameter = $parametername$" = "token

-continued $parametername$ =

"$nfinst$"/"$nfset$"/"$nfservinst$"/"$nfserviceset$"/"$servname$"/"scope"

scope = "other–service"/"callback"/"subscription–events"

recoverytime="recoverytime=" OWS date-time

The user field can contain the information of nf-type, nf-instance, nf-set, nfservice-instance and nfservice-set, to help intermediate NFs to identify the intended user of binding indication (in this example it is SMF).

The owner field can contain the information of nf-type, nf-instance, nf-set, nfservice-instance and nfservice-set, to help intermediate NFs and/or the intended user of binding indication to identify the resource owner to which the Binding applies.

In another embodiment, the binding indication is comple-mented with the intended user and/or the owner of the resource information, and is conveyed in application pay-load in message body, e.g. in the TrafficInfluData which is stored in UDR by NEF via Nudr_DataRepository API. This makes sense when the Binding is for notifications that will be valid for future interactions, that is, not only for the subsequent notification. In the second and third examples in problem description, it may not make sense to store data in UDR, so this embodiment may not be applicable.

TABLE 1

| | | | | | |
|---|---|---|---|---|---|
| TrafficInfluData | | | | | |
| Attribute name | Data type | P | Cardinality | Description | Applicability |
| . . . | | | | | |
| upPathChgNotifCorreId | string | C | 0 . . . 1 | Contains the Notification Correlation Id allocated by the NEF for the UP path change notification. It shall be included when the NEF requests the UP path change notification. | |
| upPathChgNotifUri | Uri | C | 0 . . . 1 | Contains the URI where the NEF receives the UP path change notification. It shall be included when the NEF requests the UP path change notification. | |
| subscribedEvents | array(SubscribedEvent) | O | 1 . . . N | Identifies the requirement to be notified of the event(s). | |
| dnaiChgType | DnaiChangeType | O | 0 . . . 1 | Identifies a type of notification regarding UP path management event. | |
| contextInfo | ContextInfo | C | 0 . . . 1 | This IE if present may contain e.g. the binding indication(s) along with the subscribedEvents. | |
| . . . | | | | | |

TABLE 2

| | | | | |
|---|---|---|---|---|
| ContextInfo | | | | |
| Attribute name | Data type | P | Cardinality | Description |
| origHeaders | array(string) | O | 1 . . . N | Headers or strings representing binding indication(s) complemented with the intended user and/or the owner of the resource information. |

13

Step 4. The UDR sends the binding indication including the additional information to PCF.

Step 7. If the notification call-back URI is unreachable, the SMF should use the Binding information received in step 6, to be able to identify an alternative NEF receiver for the required notification.

The messages discussed herein are merely examples for the disclosure, will not limit the scope of the disclosure. The skilled person in the art may employ different types of messages to implement the method without departing from the spirit and scope of the disclosure. Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 3:
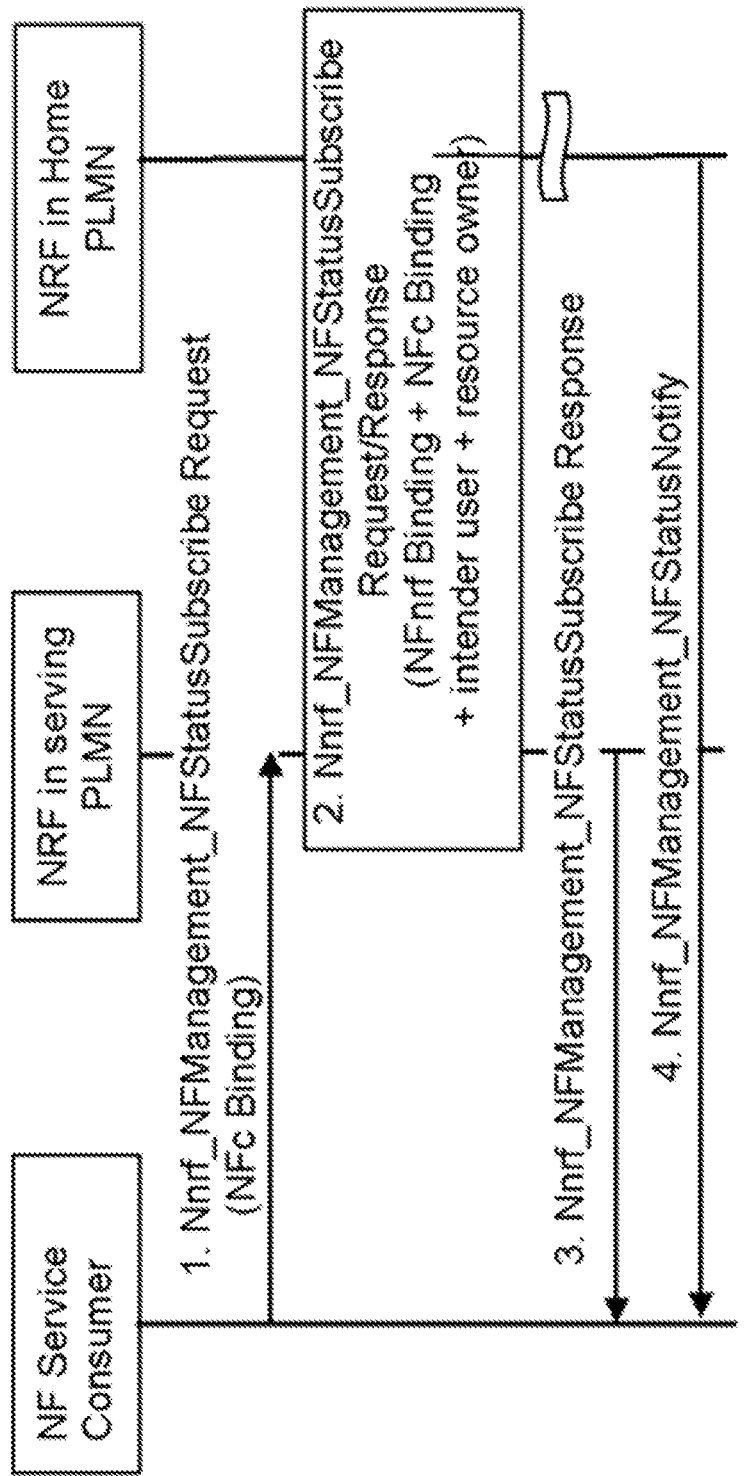
FIG. 3 illustrates a method for binding indication according to a second embodiment of the disclosure.

FIG. 3 illustrates a method for binding indication according to a second embodiment of the disclosure.

For a second example, NF/NF service status subscribe/notify traverse across PLMNs. However, in this case it is not explained how the NRF in H-PLMN gets the Binding information that is required to be used for step 4 (sending the notification). FIG. 3 provide a method to solve the problem of the second example.

Step 1: NFc includes the regular Binding indication, that will be used by the receiver (NRF in Serving-PLMN).

Step 2: The Subscription request includes the regular Binding indication (that is, the one that NRF would require to receive notifications directly from NRF in Home PLMN, but notification that are intended to itself). In the subscription request, another Binding indication is included that would apply to the NFc as a receiver of a notification. Intended user and resource owner is included as described for other first and third example.

Step 3: when the notification from NRF in Serving PLMN is required to be sent to the NFc, it uses the Binding received.

Step 4: when the NRF in Home PLMN needs to notify directly to the NFc, it has to use the newly added Binding indication (with the extra information indicated above).

Figure 4:
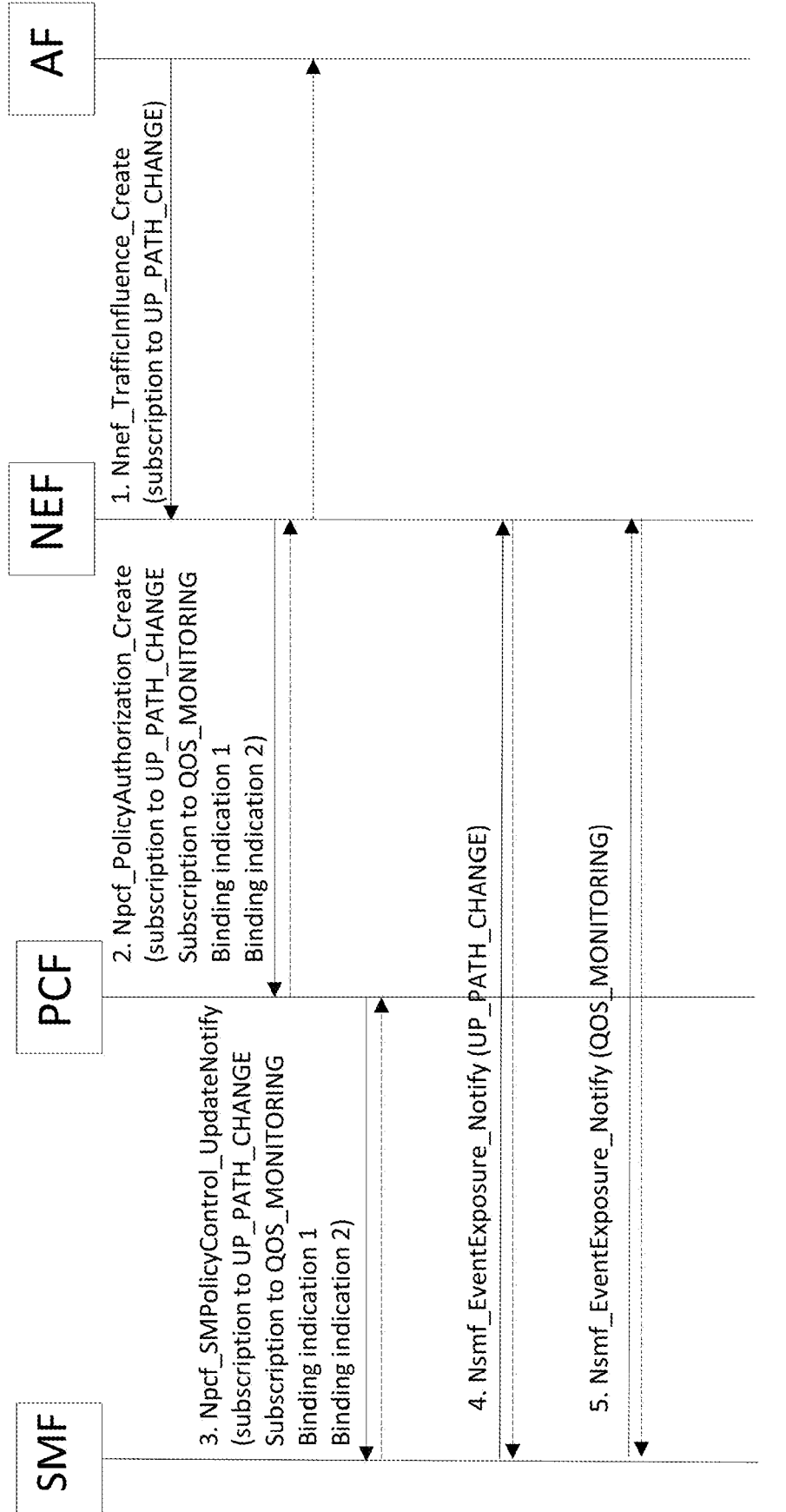
FIG. 4 provides a third example where the notification sender (NF producer) may receive multiple event subscriptions each with own different notification call-back URI and binding indication in 3gpp-Sbi-Binding header.

FIG. 4 provides a third example where the notification sender (NF producer) may receive multiple event subscriptions each with own different notification call-back URI and binding indication in 3gpp-Sbi-Binding header. However, there is no means in standard how the notification sender can distinguish which binding indication is associated (owned) by which subscription(s).

Step 1. AF sends a Nnef_TrafficInfluence_Create to NEF for traffic influence of an ongoing PDU session. This operation includes an implicit subscription to UP_PATH_CHANGE event, that is identified by SMF.

Step 2. NEF invokes the Npcf_PolicyAuthorization_Create to the serving PCF of the PDU session. For simplicity how NEF discovers the serving PCF (via NRF and BSF query) is not visualized in the call flow. The Npcf_PolicyA-uthorization_Create operation includes the subscription information from NEF on SMF for UP_PATH_CHANGE event for traffic influence. Meanwhile, based on local policy NEF may also include another subscription for QOS_MONITORING event on SMF. NEF may add two different binding indications for these two subscriptions respectively. This may happen for traffic separation, load distribution purpose.

Step 3. PCF updates the serving SMF of the PDU session on the policy change via Npcf_SMPolicyControl_Updat-eNotify. This operation contains the information on sub-scriptions from NEF on SMF for UP_PATH_CHANGE event and QOS_MONITORING event, and corresponding binding indications. However, it is not defined in standard how SMF can associate the subscriptions with binding indications which would be used if the original notification call-back URI is unreachable (in step 4 and 5). In fact, it is not described how in case an NF sends a subscription on behalf of another, specifically how the notification URI is conveyed.

For the third example in problem description, the same solution would apply. The binding indications in FIG. 3 step 2 and step 3 will be complemented with extra info (user and/or owner) as commented for first and second examples.

But more importantly, in this case, there is as well the need to identify which is the subscription (including notifi-cation URI, i.e. callback) that is associated to each Binding indication.

In a first embodiment the owner field can also contain other information (e.g. event IDs) to help intermediate NFs and/or expected user of binding indication to associate the subscriptions with binding indications.

In another embodiment, the binding indication is comple-mented with a correlation information and is conveyed in a header, e.g. 3gpp-Sbi-Binding header (ref [2]). The corre-lation information is used to correlate the binding indication with subscription(s) information. The user and owner infor-mation if need can be implicitly derived from subscription(s) information pointed by the correlation information.

$3gpp\text{--}Sbi\text{--}Binding =$

"$3gpp\text{--}Sbi\text{--}$Binding"":"#($OWS$"$bl$ ="$blvalue$ 1 ∗($OWS$"; "parameter)

$OWS$"; "$recoverytime$; $OWS$"; "correlation)

$blvalue =$ "$nf$--instance"/"$nf$--set"/"$nfservice$--instance"/"$nfservice$--set"

parameter=parametername "=" token $parametername =$

"$nfinst$"/"$nfset$"/"$nfservinst$"/"$nfserviceset$"/"$servname$"/"$scope$"

scope = "other--service"/"callback"/"subscription--events"

recoverytime="recoverytime=" OWS date-time

In one implementation the correlation information can be a JSON pointer to the resource attribute including the notification call-back URI or any parent attribute that con-tains one or more notification call-back URIs with the same binding indication.

Example, Traffic Influence

3gpp-Sbi-Binding: bl=nf-instance; nfinst=54804518-
4191-46b3-955c-ac631f953ed9;
nfset=set1.nefset.5gc.mnc012.mcc345;
servname=nnef-afi;

correlation = /pccRules/id3/refTcData

Example, QoSMonitoring

3gpp-Sbi-Binding: bl=nf-instance; nfinst=64804518-
4191-46b3-955c-ac631f953ed9;
nfset=set1.nefset.5gc.mnc012.mcc345;
servname=nnef-qos;

correlation = /pccRules/id3/refQoSMon

In another embodiment, the correlation information may be conveyed in application payload in message body, e.g. in the TrafficInfluData which is stored in UDR by NEF via Nudr_DataRepository API, as described above for first example.

Figure 5:
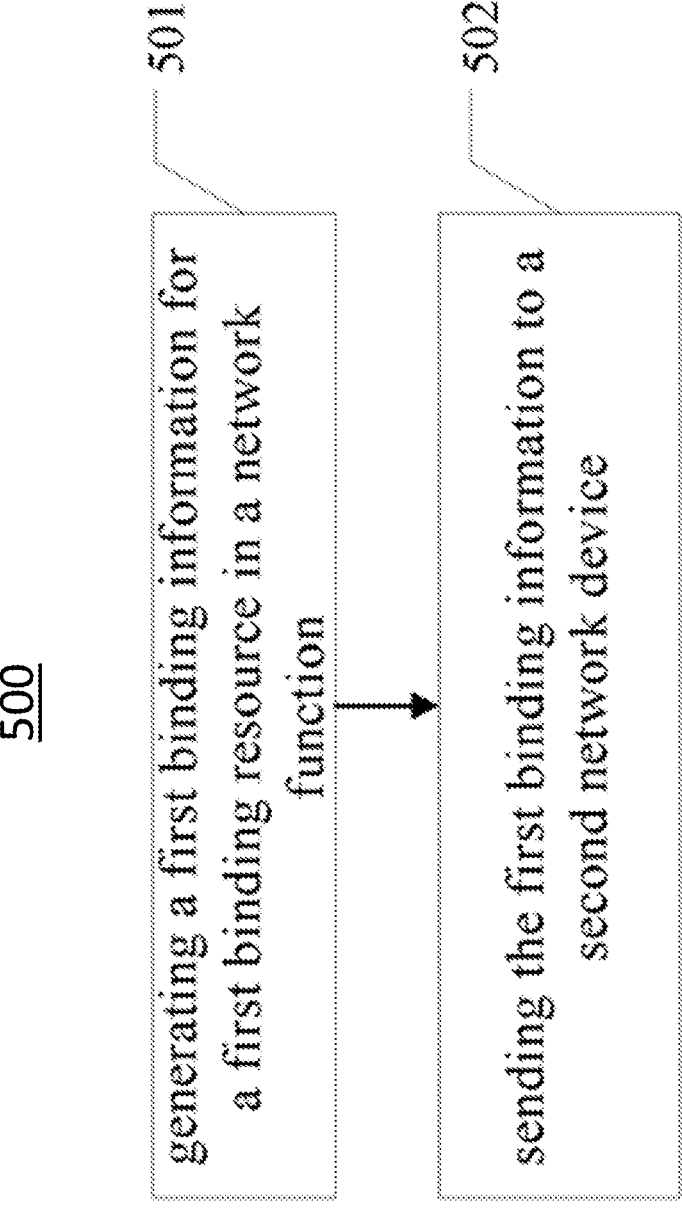
FIG. 5 illustrates an exemplary flow diagram for a method of binding indication according to one or more embodiments of the present disclosure.

FIG. 5 illustrates an exemplary flow diagram 500 for a method of binding indication according to one or more embodiments of the present disclosure.

Referring to FIG. 5, in step 501, a first binding information may be generated for a first binding resource in a network function. The first binding information may indicate a first intended user of the first binding information and a first resource owner of the first binding resource. In step 502, the first binding information is sent to a second network device.

In a further embodiment, the first binding information is included in a binding indication sent to the second network device.

In another further embodiment, the first binding information may is sent to the second network device in addition to a binding indication.

In an example, the method 500 may include generating a subscription request for a subscription event and sending the first binding information in the subscription request to the second network device.

In another example, the method may include generating a subscription request for a subscription event on behalf of a third network device and sending the first binding information in the subscription request to the second network device.

In an embodiment, the first binding information may include a first intended user identifier for the first intended user and a first owner identifier for the first resource owner.

In another embodiment, the first binding information includes correlation information which is used to correlate the first binding information with subscription information.

As an example, the correlation information may include an event identifier of the subscription event in the subscription information. As another example, the correlation information may include information to allow identification of a notification receiver. As a further example, the correlation information may be the authority part of the notification Uniform Resource Identifier URI for the subscription event in the subscription information. As a still further example, the correlation information may be a JavaScript Object Notation (JSON) pointer to the payload attribute that encodes the notification receiver of the subscription event in the subscription information.

In an embodiment, the first binding information may be included in a header to send to the second network device.

In another embodiment, the first binding information may be included in application body in a message to send to the second network device.

In another embodiment, the first binding information may be used by the second network device to send a notification directly to a third network device.

As an embodiment, the method 500 may further comprise generating a second binding information for a second binding resource created by the network function producer, the second binding information indicating a second intended user of the second binding information and a second resource owner of the second binding resource and sending the second binding information to a second network device.

FIG. 6 illustrates an exemplary flow diagram 600 for a method of binding indication according to one or more embodiments of the present disclosure.

Referring to FIG. 6, in step 601, a first binding information may be received for a first binding resource in a network function. The first binding information may indicate a first intended user of the first binding information and a first resource owner of the first binding resource. In step 602, the first binding information may be used to identify the first intended user and the first resource owner.

In a further embodiment, the first binding information may be included in a binding indication received by the second network device.

In another further embodiment, the first binding information may be received by the second network device in addition to a binding indication.

In an example, the first binding information may be received in a subscription request for a subscription event for a first network device.

In another example, the first binding information may be received in a subscription request for a subscription event from a first network device on behalf of a third network device.

In an embodiment, the first binding information may include a first intended user identifier for the first intended user and a first owner identifier for the first owner.

In another embodiment, the first binding information may include correlation information which is used to correlate the first binding information with subscription information.

As an example, the correlation information may include an event identifier of the subscription event in the subscription information. As another example, the correlation information may include information to allow identification of a notification receiver. As a further example, the correlation information may be the authority part of the notification Uniform Resource Identifier URI for the subscription event in the subscription information. As a still further example, the correlation information may be a JavaScript Object Notation (JSON) pointer to the payload attribute that encodes the notification receiver of the subscription event in the subscription information.

In an embodiment, the first binding information may be included in a header received by the second network device.

In another embodiment, the first binding information may be included in application body in a message received by the second network device.

In another embodiment, the first binding information may be used by the second network device to send a notification directly to a third network device.

In another embodiment, the first binding information may be used by the second network device to send a notification directly to the first network device.

As an embodiment, the method 600 may further comprise receiving a second binding information for a second binding resource in the network function, the second binding information indicating a second intended user of the second binding information and a second resource owner for the second binding resource; and using the second binding information to identify the second intended user and the second resource owner.

Figure 7:
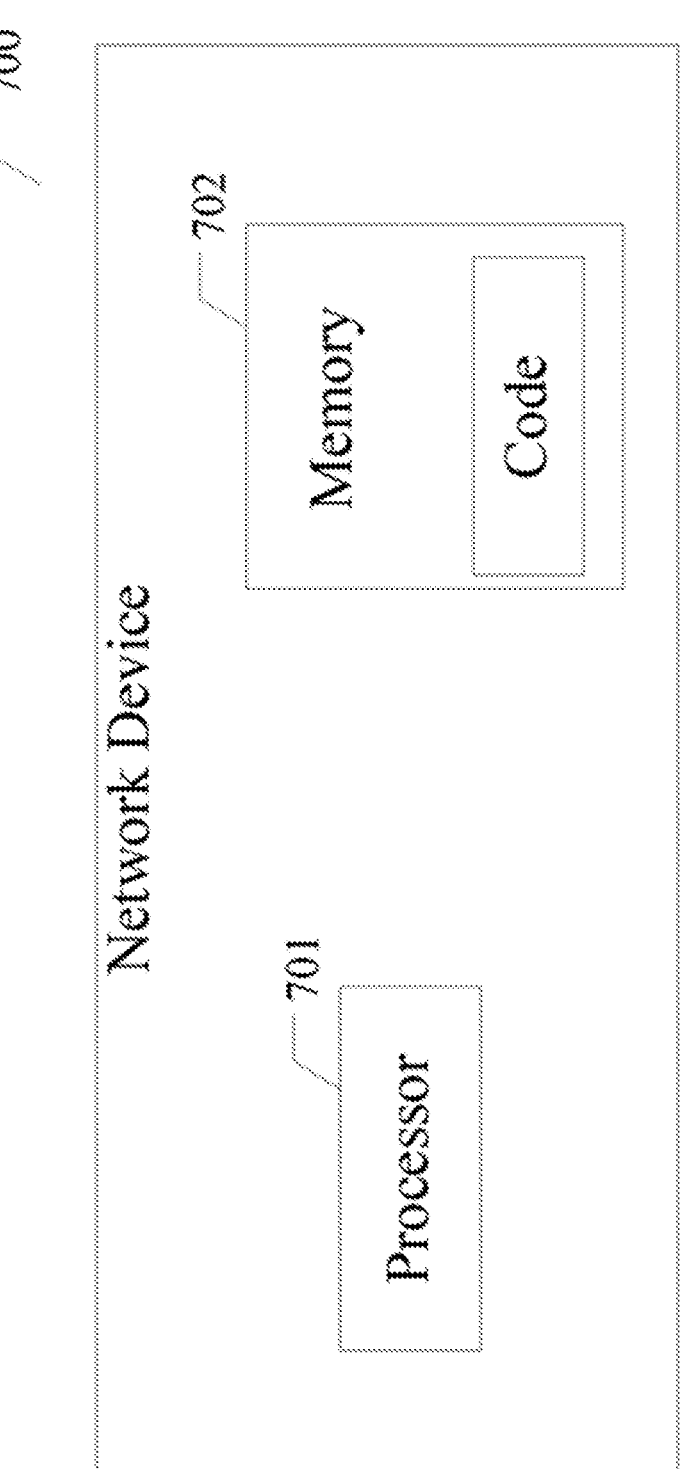
FIG. 7 is a block diagram illustrating a network device according to some embodiments of the present disclosure.

FIG. 7 is a block diagram illustrating a network device 700 according to some embodiments of the present disclosure. It should be appreciated that the network device 700 may be implemented using components other than those illustrated in FIG. 7.

With reference to FIG. 7, the network device 700 may comprise at least a processor 701, a memory 702, an interface and a communication medium. The processor 701, the memory 702 and the interface are communicatively coupled to each other via the communication medium.

The processor 701 includes one or more processing units. A processing unit may be a physical device or article of manufacture comprising one or more integrated circuits that read data and instructions from computer readable media, such as the memory 702, and selectively execute the instructions. In various embodiments, the processor 701 is implemented in various ways. As an example, the processor 702 may be implemented as one or more processing cores. As another example, the processor 701 may comprise one or more separate microprocessors. In yet another example, the processor 702 may comprise an application-specific integrated circuit (ASIC) that provides specific functionality. In yet another example, the processor 701 provides specific functionality by using an ASIC and by executing computer-executable instructions.

The memory 702 includes one or more computer-usable or computer-readable storage medium capable of storing data and/or computer-executable instructions. It should be appreciated that the storage medium is preferably a non-transitory storage medium.

The communication medium facilitates communication among the processor 701, the memory 702 and the interface. The communication medium may be implemented in various ways. For example, the communication medium may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium. The interface could be coupled to the processor. Information and data as described above in connection with the methods may be sent via the interface.

In the example of FIG. 7, the instructions stored in the memory 702 may include those that, when executed by the processor 701, cause the network device 700 to implement the methods described with respect to FIGS. 1-6.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method implemented by a Policy Control Function (PCF) in a communication network, the PCF acting as an intermediary for subscribing a Network Exposure Function (NEF) to notifications from a Session Management Function (SMF), and the method comprising:

obtaining information from a Uniform Data Repository (UDR), indicating that the NEF wants to receive notifications of a certain type for a Protocol Data Unit (PDU) session, via a specified notification endpoint that is owned by the NEF;

identifying an SMF instance that is associated with the PDU session, for producing the notifications;

generating first binding information that includes (i) an identification of the NEF as the owner of the specified notification endpoint, and (ii) an indication that the identified SMF instance is intended to send the notifications directly to the specified notification endpoint; and transmitting the first binding information to the identified SMF instance in a 3gpp-sbi-binding header;

wherein the information obtained from the UDR by the PCF is a subscription request by the NEF, and wherein the subscription request omits identification of which SMF instance is intended as the producer of the notifications.

2. The method of claim 1, wherein the first binding information is included in a binding indication.

3. The method of claim 1, wherein the first binding information is sent in addition to a binding indication.

4. The method of claim 1, wherein the first binding information is transmitted in a subscription request for a subscription event, and wherein the notifications are notifications of occurrences of the subscription event.

5. The method of claim 1, wherein the first binding information includes correlation information which is used to correlate the first binding information with subscription information.

6. The method of claim 5, wherein the correlation information includes an event identifier of the subscription event in the subscription information, and wherein the notifications are event notifications.

7. The method of claim 5, wherein the correlation information identifies the consumer network function.

8. The method of claim 5, wherein the correlation information is the authority part of the notification Uniform Resource Identifier URI for the subscription event in the subscription information.

9. The method of claim 1, wherein the notifications are event notifications of a first type for the PDU session, and wherein another NEF owns a second notification endpoint for receiving notifications of another certain type for the PDU session, and wherein the method includes the PCF sending second binding information in a 3gpp-sbi-binding header to the identified SMF instance, the second binding information identifying the other NEF as the owner of the second notification endpoint and indicating that the identified SMF instance of the producer network function is to send the notifications of the other certain type directly to the second notification endpoint.

10. A Policy Control Function (PCF) configured for operation in a communication network, the PCF comprising:

a processor; and a memory communicatively coupled to the processor and storing instructions which, when executed by the processor, cause the PCF to act as an intermediary for subscribing a Network Exposure Function (NEF) to notifications from a Session Management Function (SMF), based on causing the PCF to:

obtain information from a Uniform Data Repository (UDR), indicating that the NEF wants to receive notifications of a certain type for a Protocol Data Unit (PDU) session, via a specified notification endpoint that is owned by the NEF;

identify an SMF instance that is associated with the PDU session, for producing the notifications;

generating first binding information that includes (i) an identification of the NEF as the owner of the specified notification endpoint, and (ii) an indication that the identified SMF instance is intended to send the notifications directly to the specified notification endpoint; and transmit the first binding information to the identified SMF instance in a 3gpp-sbi-binding header;

wherein the information obtained from the UDR by the PCF is a subscription request by the NEF, and wherein the subscription request omits identification of which SMF instance is intended as the producer of the notifications.

* * * * *